Figures 1, 2:
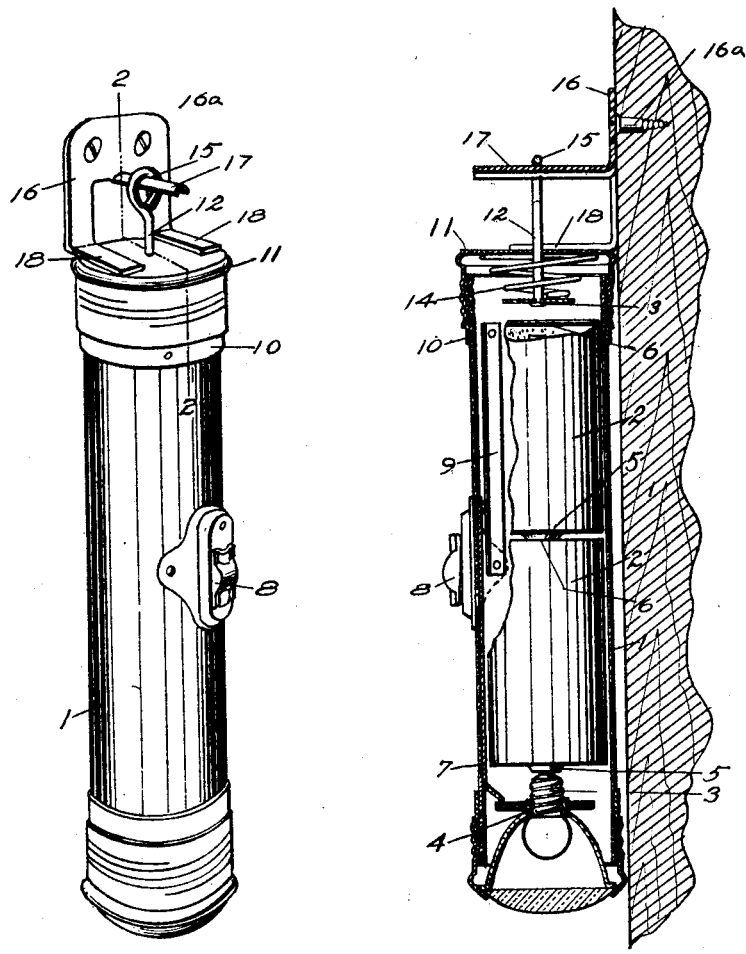

April 10, 1928.  1,665,803
V. V. VEENSCHOTEN
PORTABLE SEARCHLIGHT AND MOUNTING THEREFOR
Filed Nov. 25, 1925

INVENTOR.
Vincent V. Veenschoten
BY
ATTORNEYS.

Patented Apr. 10, 1928.

1,665,803

UNITED STATES PATENT OFFICE.

VINCENT V. VEENSCHOTEN, OF ERIE, PENNSYLVANIA.

PORTABLE SEARCHLIGHT AND MOUNTING THEREFOR.

Application filed November 25, 1925. Serial No. 71,466.

This invention is designed to provide search light conveniences in places of frequent use, such as closets, drawers and the like, the idea being to provide a mounting for a search light which will retain the search light in its accustomed place and will automatically, as the search light is put in place, open the switch so as to turn off the light. Features and details of the invention will appear from the specification and claims.

The invention is illustrated in the accompanying drawings as follows:—

Fig. 1 shows a side elevation of the search light in place on the mounting.

Fig. 2 a central section on the line 2—2 in Fig. 1.

1 marks the search light case, 2 batteries arranged within the case, 3 the usual lamp terminal, and 4 the lamp socket forming the usual circuit from the lamp. The battery has a terminal 5 engaging the lamp terminal 3 and the opposite end 6 of a battery engages the terminal 5 of the next battery in series. A conductor blade 7 extends from the terminal socket plate 4 to a switch 8. The switch 8 connects the plate 7 with a plate 9 leading to a metallic end 10 on the case 2. A cap 11 has electric contact with the end 10 and is, therefore, when the switch 8 is closed, in contact with the socket plate 4. A switch stem 12 has a head 13 adapted to engage the terminal 6 on the upper battery and a spring 14 is arranged between the cap 11 and the head 13 yieldingly forcing the head into engagement with a terminal 6. The stem 12 has a loop 15. The hanger 16 is secured to any convenient wall by screws 16ª and has a projecting finger 17 adapted to receive the loop 15. Fingers 18 also project from the hanger 16 and are so spaced from the finger 17 that when the loop, 15, is on the finger 17 and the fingers 18 on the cap 11 the head 13 is forced out of contact with the terminal 6, thus opening the circuit regardless of the position of the switch 8.

In operation the search light operates in the usual manner. The switch 8 may be utilized to open and close the switch as the circuit through the cap is closed. When, however, it is designed to hang up the device, if the switch 8 is closed the mounting compels the opening of the circuit through the battery by reason of the moving of the switch head 13 out of contact with the battery terminal.

What I claim as new is:—

1. In a portable search light and mounting therefor, the combination of a search light comprising a casing, bulb, a manually normally operated switch and a secondary switch; a supporting device on the secondary switch; and a mounting receiving the device and automatically opening the switch as the device is received by the mounting.

2. In a portable search light and mounting therefor, the combination of a search light comprising a casing, bulb and switch; a supporting device on the switch; and a mounting receiving the device and automatically as the device is put in place in the mounting opening the switch.

3. In a portable search light and mounting therefor, the combination of a search light comprising a casing, bulb, a manually normally operated switch and a secondary switch; a switch suspending loop secured on the secondary switch; and a mounting receiving the loop and automatically opening the switch as the loop is put in supporting position on the mounting.

4. In a portable search light and mounting therefor, the combination of a search light comprising a casing, bulb and switch; a switch suspending loop secured on the switch; a mounting receiving the loop; and means on the mounting engaging the casing and forcing the switch to open position as the loop is placed on the mounting.

5. In a portable search light and mounting therefor, the combination of a search light comprising a casing, bulb and switch; a mounting for the search light comprising two spacing fingers; and a loop extending from the switch adapted to engage one of the fingers as the other finger engages the case to force the switch to open position.

In testimony whereof I have hereunto set my hand.

VINCENT V. VEENSCHOTEN.